No. 711,414. Patented Oct. 14, 1902.
C. BOREL.
UNDERGROUND ELECTRIC CONDUCTOR.
(Application filed June 11, 1902.)
(No Model.)
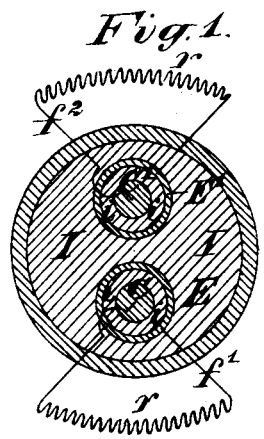
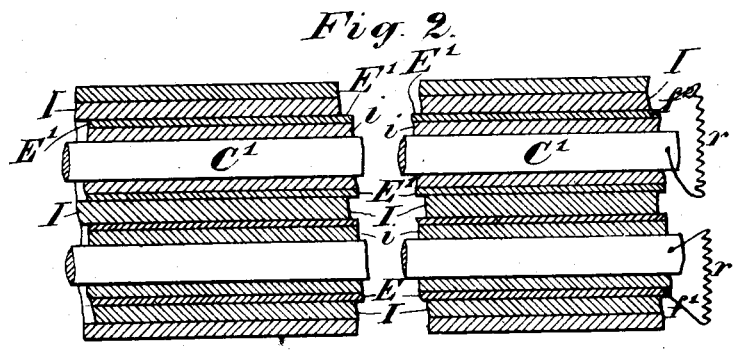
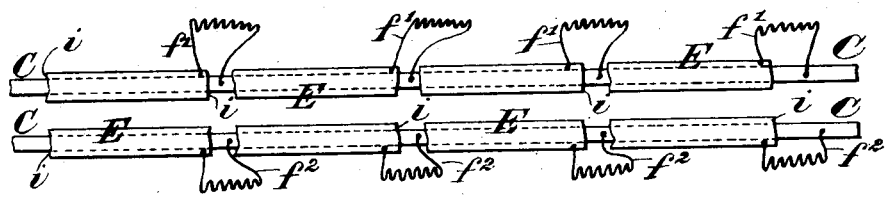
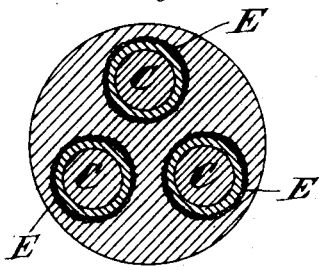
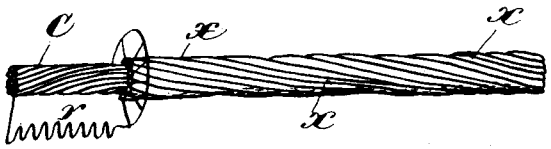
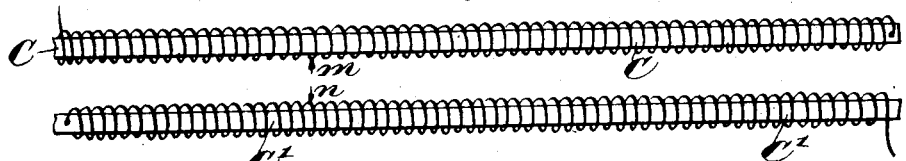
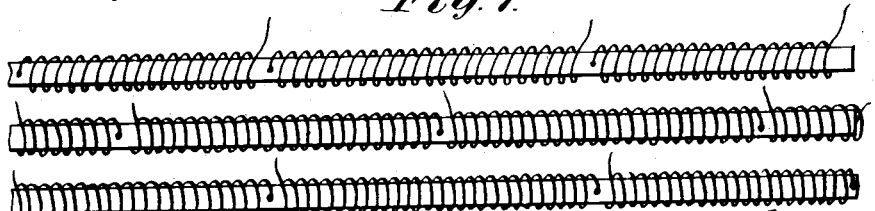
Witnesses.
Inventor.
Charles Borel.

UNITED STATES PATENT OFFICE.

CHARLES BOREL, OF LYONS, FRANCE, ASSIGNOR TO SOCIÉTÉ FRANCAISE DES CÂBLES ELECTRIQUES, (SYSTÈME BERTHOUD, BOREL ET CIE.,) OF LYONS, FRANCE.

UNDERGROUND ELECTRIC CONDUCTOR.

SPECIFICATION forming part of Letters Patent No. 711,414, dated October 14, 1902.

Application filed June 11, 1902. Serial No. 111,135. (No model.)

*To all whom it may concern:*

Be it known that I, CHARLES BOREL, a citizen of the French Republic, residing at Lyons, France, have invented certain new and useful Improvements in Underground Electric Conductors, of which the following is a specification.

This invention relates to conductors of electric currents which are to be placed underground, and particularly to cables.

The excessive rises of voltage which occur in underground electric conductors in consequence of sudden disturbances in the conditions of the circuit are now well known. The remarkable works which C. P. Steinmetz has published on the subject supply a complete analysis of these phenomena and determine the conditions under which they are produced with the greatest intensity. These excessive rises of voltage are sometimes such that on opening a short circuit no insulator can efficiently resist them. Steinmetz cites an example in which the great rise of voltage resulting from the sudden opening of a short circuit amounted to three hundred and thirty thousand volts, while the normal voltage of the system was only ten thousand volts. It is therefore necessary that if it be desired to have underground cables which can in all cases withstand the accidental excess in rises of voltage referred to by Steinmetz they should be constructed with such thickness of insulator that their cost would be excessive, rendering their use unattainable. I have therefore endeavored to remedy this evil and in studying the matter very closely have found the following solution: It does not consist in constructing cables with remarkable material having electric resistance ten times that of known materials, but in constructing cables with insulating materials usually employed, introducing, however, an arrangement which constitutes my invention and which is based on the well-established law which prevents the occurence of oscillations of voltage in any possible case. Steinmetz has ascertained and demonstrated that these excessive rises of voltage, dangerous for electric cables, come, in fact, from the cables themselves. They are caused by oscillating charges and discharges of the condensers which are formed by the conductors and protecting-coverings of the cables, and it is proved that these phenomena cease to be oscillatory and are transformed into a logarithmic charge when the resistance of the circuit is greater than twice the square root of the inductance by the capacity of the line, or, in other words, the square root of the quotient of the self-induction divided by the capacity of the line $$v = 2\sqrt{x\,K} \text{ or } v = 2\sqrt{\frac{L}{C}}.$$

In order, therefore, to diminish excessive rises of voltage by sudden variations of conditions in a system, it is necessary to increase the resistance of the conductors in the system and to introduce a resistance in the circuit in such a manner that the relation above stated shall be satisfied; but under these conditions the loss in conductivity would immediately be very great and the working would be far from economical. Here I would observe that it is necessary to oppose this resistance only to the charge and discharge currents of the conductor of the cable and not to the usual operating-currents. In order that this may be done—that is to say, in order that the resistance of the circuit may be increased only for the charge and discharge currents of the conductors without affecting the operating-currents—I have devised a construction of the conductors of the cables in the following manner: Around each conductor of a cable I put a conducting-cover, concentrically surrounding the whole of it, the cover being insulated from the conductor itself by a thin concentric layer of insulating material.

In the accompanying drawings, which illustrate embodiments of my invention, Figure 1 is a transverse section, and Fig. 2 a longitudinal section, of a cable having two parallel conductors. Fig. 3 is a side elevation of the cable represented somewhat diagrammatically. Fig. 4 is a cross-section of a cable with three conductors of twisted wires with wire covers. Fig. 5 shows the conductor provided with a cover formed of insulated wires. Fig. 6 is a diagrammatic view illustrating a cable with two conductors having wires of high resistance wound helically about them. Fig. 7 illustrates a modification of the construction seen in Fig. 6.

Referring primarily to Figs. 1 and 2, C and C' are two parallel conductors, each of which is surrounded by a concentric conducting-cover E and E', insulated from the conductor by an insulating layer $i$. Each conductor thus surrounded by its cover is then insulated in the usual way from its neighbor and from earth by the insulating material I. If now at one of the ends of the cable—for instance, at the generating-station—we connect the conductor C to its cover E by a wire $f'$, the charge-currents of the conductor C will all pass to the cover E, since it everywhere surrounds it and really constitutes its external surface, and it is proved that static electricity passes always to the surface of conductors. As the cover E is insulated throughout its length from the conductor C, except at the end where it is connected by the wire $f'$, all the charge and discharge currents of the conductor will therefore pass by this wire to the surface of the cover, while the operating-currents will continue to pass by the conductor C. For the conductor C' it is the same when the cover E', which everywhere surrounds the conductor C', is connected to this conductor by a wire $f^2$. It is easy to make the wires $f'$ $f^2$ joining the covers to the conductors of sufficient resistance to prevent the discharge of the condensers formed by the covers E and E' from being oscillatory. This resistance which those wires must have may be easily calculated by the relation which has been stated above. I have indicated them on the drawings by the letter $r$.

If in a system of underground cables of great extent the capacity of the conductors is great and if owing to this the charge and discharge currents should have great tension, it will be necessary when such a system is to be constructed with my cables having their conductors divided into two, the one for the operating and the other for the charge currents, to connect only at the generating-station the outer conducting layer to the "conductor," properly so called, by a wire of suitable resistance; but these outer conducting-covers may be made in several independent sections, each connected for itself by a wire of the desired resistance to the central conductor. This division of conducting layers for charge-currents and the connection of a section to the central conductor may be effected in the kiosks or the connecting-boxes of the system. Fig. 3 is a diagram of a long line of cable with two parallel conductors, each divided into two, according to my system, showing the way in which the conducting-cover can be divided into sections each separately connected to the central conductor. The insulating layer $i$, which separates the concentric conducting-cover E from the conductor proper, C, and this conductor, may be made as weak as can possibly be made. The conducting-cover E may be a thin lead tube put on by hydraulic pressure, like the protecting lead covers which usually surround cables. This cover E may also consist of a tin, zinc, or other conducting-ribbon wound helically over the insulating layer $i$. It may also consist of a concentric circle of cylindrical wires, of copper or other conductor, wound on the insulating layer $i$. This cover E then resembles the external conductor of cables made with two concentric conductors. Fig. 4 is a section of a cable having three twisted conductors provided with my covers E for charge-currents, each cover consisting of conducting-wires arranged in a concentric circle. The cover E for charge-currents may also consist of separately-insulated wires $x$, twined directly on the central conductor C without first putting an insulating layer on this conductor. This circle of peripheral insulated wires around the conductor C is the same as that which is the object of the French patent, No. 277,979; but instead of being connected to the two ends of the cable, so that it conducts at the same time the operating and the charge and discharge currents, this cover is now (in order to obtain the result herein explained, which has occasioned my present invention) connected only by one of its ends to the central conductor, not directly, but through a suitable resistance sufficient to render the discharges from this circumferential layer of wires not oscillatory.

Fig. 5 shows a conductor C, furnished with a concentric cover of insulated wires $x$, connected at one end only to the central conductor by a conducting resistance-wire $r$. By means of this concentric cover for charge and discharge currents, formed of insulated circumferential wires, the auxiliary resistance-wires $r$, connecting the central conductor to the circumferential cover at one of its ends, may be dispensed with, which has the great advantage of simplifying the distributing arrangement and the connecting-boxes, these apparatus being generally overcharged. In order to attain this result, it suffices to make the concentric exterior conducting-cover consist of a small number of insulated circumferential wires, such as two or three, or even of a single insulated wire, the wire or wires being wound around the central conductor in a helix of very short pitch. The wire or wires wound helically may be of material of relatively high specific resistance, such as lead, ferro-nickel, German silver, &c. Then in order that at all parts of the conductor the charges and discharges of the circumferential wires may pass through the desired resistance $r$ they must be connected directly to the central conductor, not at the same end for all the conductors of one cable, but for a cable having two twisted conductors—for instance, as shown diagrammatically in Fig.

6. The wire which helically surrounds the conductor C is directly connected to it at the end next the generating-station, (the right in Fig. 6,) and the wire surrounding the conductor C' is connected to it at the end next the system, (the left in Fig. 6.) In this way the charge and discharge currents of two points $m$ and $n$, facing each other at, say, one-third of the length of the cable, must pass for the circumferential wire of C first through one-third of its total length, then that of the conductor C' two-thirds of this wire, making up together the total length of the wire wound on the conductor. If, therefore, one of these helically-wound wires has in the first instance a resistance $r$ sufficient for preventing the discharges of the capacity of the cable from being oscillatory, it is no longer necessary to connect it to the central conductor by an auxiliary resistance, but it can be connected directly. For cables having three conductors the connections of the helical wires of high resistance to their respective conductors are situated in quincunx arrangement, as shown diagrammatically in Fig. 7.

The section of the insulated wires constituting my covers for charge and discharge currents may be of any shape—cylindrical, square, rectangular, &c.

Having thus described the nature of this invention and the best means I know for carrying the same into practical effect, I claim—

1. An underground electrical conductor having a conducting-cover of tubular form over the whole of it, disposed concentrically with it and insulated from it throughout its length, said exterior and interior conductors being electrically connected at one end by a conductor of suitable resistance, substantially as set forth.

2. An underground cable having parallel electric conductors each having an inclosing conductor of substantially tubular form disposed concentrically with the inner conductor and insulated from it by a thin layer of insulating material, the said outer and inner conductors being connected at their ends by a metal conductor of suitable resistance and all the conductors of the cable embedded in an insulating material, substantially as set forth.

3. An underground electric conductor comprising an inner conductor having an outer conducting-covering composed of helically-wound insulated wire, the said inner conductor being connected at one end only with the wire or wires forming the outer conducting-covering, substantially as set forth.

In witness whereof I have hereunto signed my name in the presence of two subscribing witnesses.

CHARLES BOREL.

Witnesses:
EUG. DUMONT,
LOUIS DÉNÉRÉAZ.